Dec. 9, 1930.      B. BRONSON      1,784,781
COMPOSITE STEEL AND RUBBER ARTICLE
Filed Dec. 22, 1927
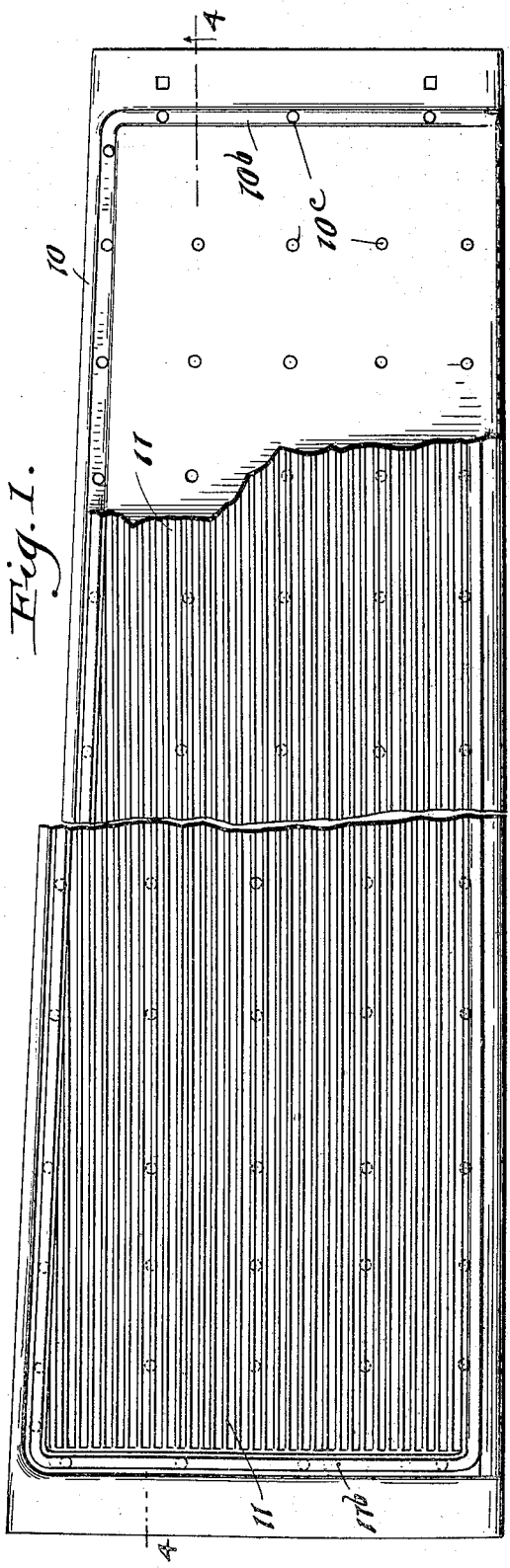
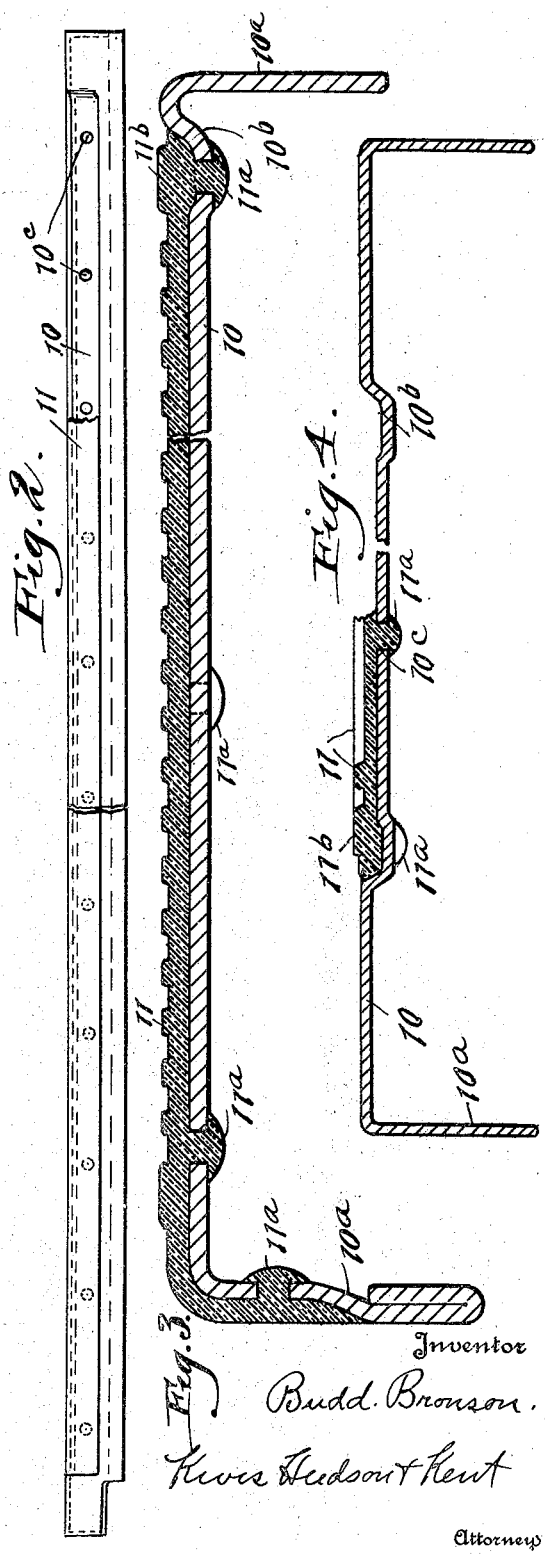
Inventor
Budd Bronson
Attorney Patented Dec. 9, 1930

1,784,781

UNITED STATES PATENT OFFICE

BUDD BRONSON, OF LAKEWOOD, OHIO, ASSIGNOR TO THE OHIO RUBBER COMPANY, OF CLEVELAND, OHIO, A CORPORATION OF OHIO

COMPOSITE STEEL AND RUBBER ARTICLE

Application filed December 22, 1927. Serial No. 241,771.

This invention relates to a steel and rubber article of the type wherein rubber or equivalent non-metallic composition is attached by vulcanization or equivalent treatment to a metal base such as a base stamped from rolled sheet metal.

More particularly, the invention relates to running boards for motor vehicles formed from an elongated stamped sheet metal body with a layer of rubber vulcanized and interlocked to the top and front edge of the running board body.

The object of the present invention is to provide a running board or equivalent member of satisfactory form and construction and wherein the non-metallic covering is so effectively fastened to the metal body that it is not likely to become loosened or torn from place due to the rough usage to which an article of this kind is normally subjected.

The invention may be briefly summarized as consisting in certain novel details of construction and combinations and arrangements of parts which will be described in the specification and set forth in the appended claims.

The running board construction comprising a metal base formed of hot-passed steel and a non-metallic tread attached thereto, which is disclosed but not claimed herein, is claimed in my copending application Serial No. 488,517 filed October 13, 1930.

In the accompanying sheet of drawings, Fig. 1 is a top plan view of a running board formed in accordance with my invention; Fig. 2 is a front edge view of the same; Fig. 3 is a transverse sectional view on an enlarged scale; and Fig. 4 is a longitudinal sectional view substantially along the line 4—4 of Fig. 1. In Figs. 1, 2 and 4 a portion of the rubber covering is broken away to show the metal base beneath.

Referring now to the drawings, the running board body is designated 10, this body being formed from rolled steel and stamped into the shape illustrated. However, before describing the details of the body 10, it might be stated that it is an important feature of the invention that the covering of non-metallic material, in this instance rubber, is very uniformly attached to the metal base or body by mechanically interlocking the rubber and metal along the margin and at spaced points inside the margin, and also by a firm, uniform adherence of the rubber to the metal body secured when the rubber is molded and vulcanized to the body. This latter feature is due to the fact that I employ a metal base stamped from sheet metal of hot-passed steel, and, therefore, having a surface roughness admirably adapted to secure the desired uniform adherence between the rubber and steel. The steel generally used in automobile constructions is very smooth-surfaced, due to the fact that the final passing takes place while the steel is in a cold state, but with steel of this character the strong adherence of the rubber to the steel is not obtainable. However, by using hot-passed steel, the desired clinging of the rubber to the steel is obtained, this being supplemented by the mechanical interlocking to be referred to presently.

The metal base or body 10 is flanged downwardly along both sides and ends, as illustrated at 10$^a$, this being for the purpose of stiffening the body and also to provide for the covering of the front edge surface of the running board body with the rubber. Additionally, there is formed within the margins of the metal body a shallow depression. This depression extends over the major portion of the top surface of the metal body and is carried over and downward for a distance onto the front flange 10$^a$, as is clearly illustrated in Fig. 3. There is also provided along the margin of that portion of the depression which occupies the top surface of the running board body a trough-like groove 10$^b$. That is to say, this groove extends along the back and across the ends of the depression, but is preferably not carried down the front flange 10ª.

The covering of non-metallic material is indicated at 11, this covering consisting preferably of rubber or rubber composition. It is of course applied to the running board body in an unvulcanized state, and it is molded and vulcanized to the metal body in a suitable vulcanizing press. In the molding operation, the top surface of the rubber is given a suitable configuration which in this instance consists of longitudinal ribbing, and at the same time the rubber is caused to adhere to the rough surface of the metal body (inherent to the hot-passed steel) and it is also mechanically interlocked to the metal body. This interlocking is obtained in this case by providing in the metal base a large number of perforations 10ᶜ which are arranged in the base of the groove 10ᵇ so that the rubber will be interlocked along its margin where the greatest holding power is desired, and these perforations are arranged also at intervals inside the margin, there also being a row along the front downturned flange 10ª. In the molding and vulcanizing operation, the rubber is squeezed through these perforations and the equivalent of rivet heads, indicated at 11ª, are formed on the under or inner side of the metal base, which rivet heads are obtained by forming slight depressions in the lower member of the vulcanizing press directly beneath or opposite the perforations 10ᶜ.

By this construction and method of procedure, there is produced a running board body with a shallow depression which is filled or substantially filled with the rubber which covers the major portion of the top of the running board body and extends down to cover the front lip or flange, the rubber in the molding and vulcanizing operation being uniformly attached to the steel by the adherence of the rubber to the surface of the metal, and, additionally, it is mechanically interlocked with the metal base by a series of rubber rivets integral with the rubber on the top of the board and located around the margin where the rubber fills the trough-like groove 10ᵇ and therefore is relatively thickened, and also on a line where the rubber extends down over the major portion of the front lip or flange and at a multiplicity of points inside the margin. By so constructing the running board body and by causing the rubber to be fastened thereto in the manner described above, the rubber is held so securely that it does not pull loose by rough usage, including the action of the feet in entering or leaving the car or accidental kicking of the front edge of the board.

As previously stated, in the molding and vulcanizing operation a suitable configuration is given to the rubber, this being a ribbed configuration with the ribs running longitudinally of the running board. In this instance that portion of the rubber which covers the top of the board has a marginal rib 11ᵇ somewhat heavier or thicker than the longitudinally extending ribs inside this marginal rib 11ᵇ, and preferably the rubber of the forward portion, including that extending down over the front edge, is smooth, as illustrated. This precise configuration is, of course, unnecessary to the invention but has been found in practice to be serviceable and attractive, and therefore satisfactory.

Having thus described my invention, I claim:

1. A running board for motor vehicles comprising a sheet metal running board body flanged downwardly at its front margin and formed with a depression which is carried down into the front flange, and a covering of rubber molded and vulcanized to the body and filling the depression.

2. A running board for motor vehicles comprising a sheet metal running board body flanged downwardly at its front margin and formed with a depression which is carried down into the front flange, and a covering of rubber molded and vulcanized to the body and filling the depression, the rubber extending over the major portion of the top and down the front flange of the metal body in one continuous sheet and having a substantially uniform strong adherence to the metal body throughout the rubber covered surface thereof.

3. A running board for motor vehicles comprising a sheet metal body flanged at its margins and having a shallow depression formed on the top and extended down along the front flange, and a covering of rubber molded and vulcanized to the running board body so as to substantially fill the depression and mechanically interlocked by rivets of rubber extending through perforations in the metal body along the margin and inside the margin.

4. A running board having a sheet metal body with a downwardly extending flange along the front edge thereof, said flange having a lower portion extending outwardly beyond the upper portion thereof, and a covering of rubber vulcanized to said body so as to extend over said front edge and engage against said lower portion.

5. In combination with a running board, or step, which includes a sheet of suitable material on one edge of which is provided a downwardly extending flange, a depression in the upper surface of the sheet, a depression in the flange communicating with the depression in the upper surface of the sheet, and a tread located in said depressions and secured to the body of the sheet and to the flange.

6. In combination with a running board, or step, which includes a sheet of material on one edge of which is provided a downturned flange, a depression in the upper surface of the sheet, a depression in the flange communicating with the depression in the upper surface of the sheet, perforations in the flange and in the body of the sheet, and a tread covering a substantial portion of the body of the sheet and a portion of the flange and having integral portions extending through the perforations to secure the tread to the sheet.

In testimony whereof, I hereunto affix my signature.

BUDD BRONSON.